US 8,533,048 B2

(12) United States Patent
Charania

(10) Patent No.: US 8,533,048 B2
(45) Date of Patent: Sep. 10, 2013

(54) ADVERTISEMENT REVENUE MANAGEMENT

(75) Inventor: Aamer Charania, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 677 days.

(21) Appl. No.: 12/560,907

(22) Filed: Sep. 16, 2009

(65) Prior Publication Data

US 2011/0066487 A1 Mar. 17, 2011

(51) Int. Cl.
*G06Q 30/00* (2012.01)

(52) U.S. Cl.
USPC .................................................. 705/14.69

(58) Field of Classification Search
USPC ........................................................ 705/14
See application file for complete search history.

(56) References Cited

U.S. PATENT DOCUMENTS

| | | | |
|---|---|---|---|
| 2002/0072966 A1* | 6/2002 | Eldering et al. | 705/14 |
| 2002/0077891 A1* | 6/2002 | Castle et al. | 705/14 |
| 2002/0083444 A1* | 6/2002 | Blasko et al. | 725/35 |
| 2002/0133399 A1* | 9/2002 | Main | 705/14 |
| 2003/0050827 A1* | 3/2003 | Hennessey | 705/10 |
| 2005/0015800 A1* | 1/2005 | Holcomb | 725/35 |
| 2008/0127252 A1* | 5/2008 | Eldering et al. | 725/34 |
| 2008/0167943 A1* | 7/2008 | O'Neil et al. | 705/10 |
| 2008/0195484 A1* | 8/2008 | Fox | 705/14 |
| 2009/0119172 A1* | 5/2009 | Soloff | 705/14 |
| 2010/0131360 A1* | 5/2010 | Shifflett et al. | 705/14.48 |
| 2010/0257054 A1* | 10/2010 | Martin et al. | 705/14.46 |
| 2011/0055011 A1* | 3/2011 | Loughery et al. | 705/14.52 |
| 2011/0202410 A1* | 8/2011 | Ginsburg et al. | 705/14.69 |

* cited by examiner

*Primary Examiner* — Matthew L Hamilton

(57) ABSTRACT

Maximizing revenue for sales of advertisement slots between a content provider and an advertiser includes identifying a plurality of advertiser segments and identifying a plurality of advertisement slots, estimating a utility value for each identified advertisement slot, and determining an estimated optimal grouping of advertisement slots based on the estimated utility values.

27 Claims, 2 Drawing Sheets

ADVERTISEMENT REVENUE MANAGEMENT

BACKGROUND

Revenue management generally includes attempting to maximize revenue through differential pricing and inventory control when selling a product or service. Revenue management may be relatively straightforward when it comes to airline tickets, hotel rooms, or rental cars, where the unit of sale is usually a single ticket, a single room, a single car, or at most a few units. However, advertisement slots, particularly for television, are usually requested, bought, and sold in various groupings. Therefore, revenue management for advertisements may require different techniques to maximize revenue.

DETAILED DESCRIPTION

Figure 1:
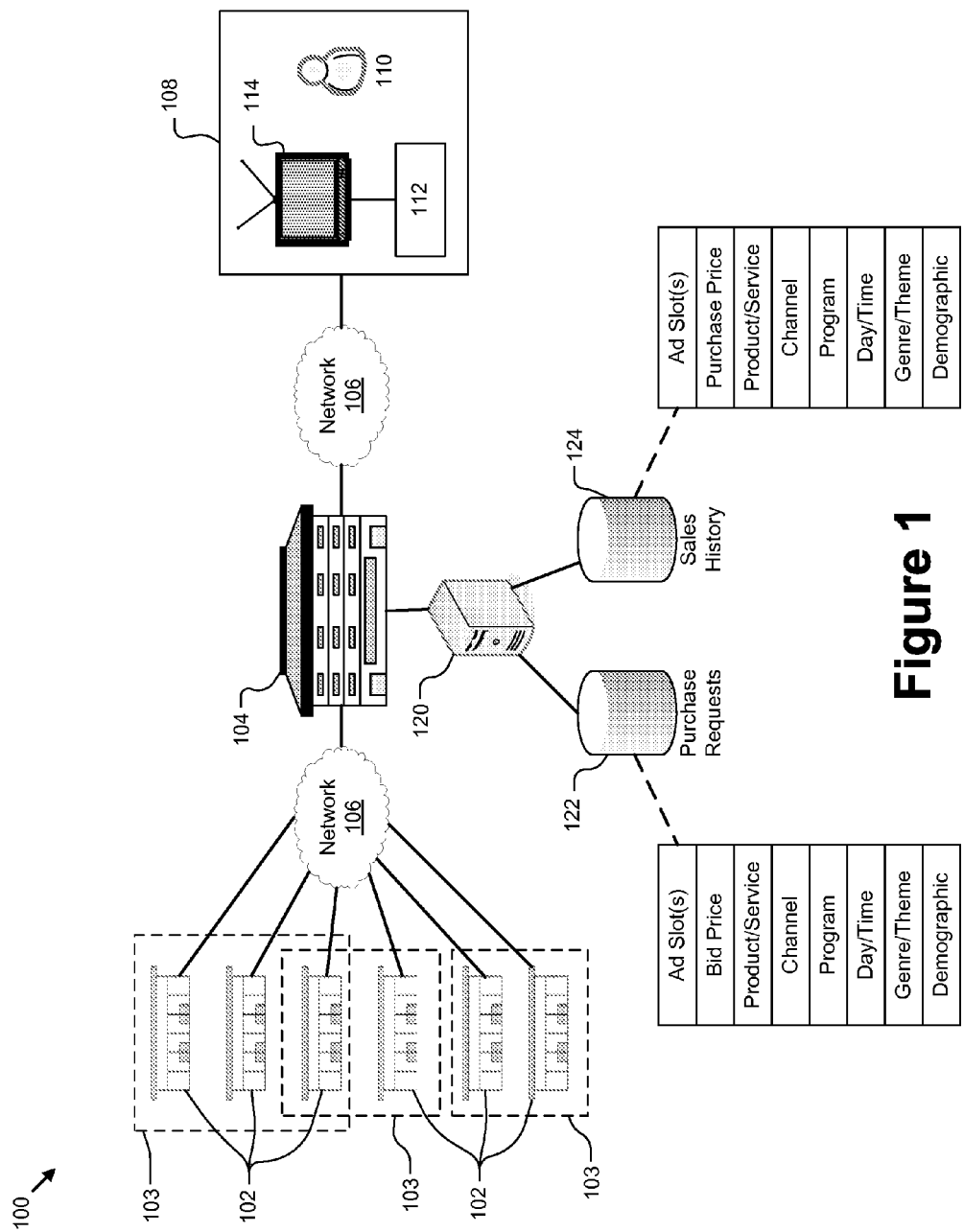
FIG. 1 illustrates an exemplary system for estimating optimal pricing and/or optimal inventory for one or more advertisement slots.

FIG. 1 illustrates an exemplary system 100 for increasing revenue derived by a content provider 104 from selling advertisement slots to advertisers 102. System 100 identifies advertisers 102 that share some common characteristic(s) and groups them into one or more advertiser segments 103. System 100 then estimates a utility value for each of a plurality of advertisement slots for each advertiser segment 103. A utility value may be viewed as an estimate of the value of that particular advertisement slot to a particular advertiser segment 103, such as by estimating the price that one advertiser 102 is willing to pay for that advertisement slot.

To maximize revenue, system 100 may determine an estimated optimal grouping of advertisement slots for each advertiser segment 103 based on the estimated utility values. For example, system 100 may attempt to create groupings of advertisement slots such that the total utility for all advertisement slots is at a maximum. System 100 may also take an iterative approach by creating and then iteratively modifying the groupings of advertisement slots to determine groupings that are likely to fetch the highest price when sold to advertisers 102. System 100 may utilize a revenue management engine 120 to perform one or more steps of the analysis, as discussed in detail below.

As illustrated in FIG. 1, system 100 includes a plurality of advertisers 102 that communicate with a content provider 104 via one or more networks 106. Content provider 104 sells advertisement slots to advertisers 102, and may receive purchase requests and negotiate sales electronically via network 106. Content provider 104 provides a media content presentation to a plurality of customer premises 108, where the media content presentation includes advertisements (e.g., commercials) possibly provided by at least one advertiser 102. Such advertisements may be provided according to the purchased advertisement slots (e.g., in terms of when the advertisement is presented, to which demographic, on which channel, with which program, or based on some other aspect of the purchased advertisement slot). Content provider 104 may use a revenue management engine 120 to determine prices and groupings of advertisements slots.

Advertiser 102 may be a company selling a product or service, a political action committee, an advertising agency, or any other entity that participates in purchasing advertisement slots from content provider 104. Advertisers 102 may be promoting a product, a service, a brand, an image, a movie, a political agenda, a public service, or desire to provide some other message via one or more advertisement slots. Generally, advertiser 102 communicates with content provider 104 to select and purchase one or more advertisement slots. Such communication may be handled electronically via network 106, such as via e-mail, a website, a web portal, a client-server application, or some other form of electronic communication. In one exemplary approach, advertisers 102 purchase advertisement slots from content provider 104, and then provide commercials or other advertisement based media content for the purchased advertisement slots. Content provider 104 then provides the advertisements to customer premises 108, typically as a portion of a media content making up a media content presentation as discussed above.

Advertiser 102 may identify and purchase advertisement slots from content provider 104 based on an advertising strategy, such as an advertising campaign. Generally, such a strategy attempts to identify those advertisement slots that offer the greatest utility to that advertiser 102. For example, the utility of an advertisement slot to an advertiser 102 can be viewed by determining how closely an advertisement slot meets the requirements as outlined in an advertising strategy. Further, the utility of an advertisement slot to an advertiser 102 correlates to the value of that advertisement slot to that advertiser 102, and may also correlate to the price that the advertiser 102 is willing to pay for that advertisement slot. In addition, the utility of an advertisement slot may be correlated with other available advertisement slots to determine an estimated optimal grouping of advertisement slots.

For example, an advertiser 102 may view one advertisement slot as high value, high utility because it targets a specific demographic, such as a targeted age/income bracket. In another example, an advertiser 102 may view an advertisement slot of high value, high utility due to its particular timing, such as a campaign commercial being aired during a critical juncture of a campaign, or a movie commercial being aired just before the movie is released. Generally, the greater the utility value, the more an advertiser 102 is willing to pay for that advertisement slot. However, the converse may also be true—the lower the utility value, the less an advertiser 102 is willing to pay. For example, an advertisement slot that is highly unlikely to deliver a commercial to a target demographic is likely to be of little utility and therefore of low value to an advertiser 102.

While advertiser 102 may be purchasing advertisement slots based on an advertising strategy, advertiser 102 may not share the strategy with content provider 104. However, as discussed in detail below, content provider 104, possibly using revenue management engine 120, may be able to estimate which advertisement slots will offer the greatest utility to a particular advertiser. Thus, content provider 104 can determine an optimum price for each advertisement slot, and also group advertisement slots together based on the calculated utility values for the advertisement slots.

System 100 may group advertisers 102 into one or more advertiser segments 103, as illustrated in FIG. 1. Advertiser segment 103 is generally a grouping of advertisers 102 that share one or more common characteristics, such as those characteristics that affect their advertisement slot purchase behavior. Further, such characteristics may illustrate advertisement slot preferences that are common for each advertiser 102 in an advertiser segment 103. An advertiser segment 103 may be thought of as a grouping of advertisers 102 where the utility value of one advertisement slot will be similar for each advertiser in the advertiser segment. Put another way, an advertiser segment 103 is generally a collection of advertisers 102 (e.g., entities that purchase advertisement slots from content provider 104) that have similar preferences when it comes to choosing advertisement slots. Such preferences may include similar time slots, targeted demographic groups, length, television program or channel, or some other identified advertisement slot preference.

For example, an advertiser segment 103 may be based on a target demographic, a marketing study, a demographic study, past advertisement slot purchase history, advertisement slot purchase requests, or some combination of these and/or some other characteristic that affects the advertisement slot purchase behavior of one or more advertisers 102. Advertisers 102 grouped into an advertiser segment 103 generally desire similar advertisement slots, and thus can be expected to derive similar utility from certain advertisement slots, as discussed in more detail below with respect to process 200. Of course, advertisers 102 may be grouped together into advertiser segments 103 based on any common characteristic to help derive maximum value when selling advertisement slots. For example, advertisers 102 may be grouped based on how much they typically spend on advertising (e.g., their advertising budget), based on the amount they have or will pay per advertisement slot, or some other financial characteristic.

In one example, certain advertisers 102 may promote products or services targeted toward children, and therefore these advertisers 102 may be grouped together into an advertiser segment 103 for children. Such advertisers 102 can be grouped together into a common advertiser segment 103 because these advertisers 102 typically purchase advertisement slots on children's channels at certain age appropriate times during a day. More specifically, such advertisers 102 may desire advertisement slots shown on school days during the early evening and on children friendly channels, such as the Disney Channel®. So Crayola Crayons® may be in the same advertiser segment 103 as companies selling other children's products since such advertisers 102 likely desire similar advertisement slots. Other advertiser segments 103 may include political campaigns, health products, movie trailers, or some other grouping of advertisers 102 that desire similar advertisement slots.

Content provider 104 is generally one or more systems and/or entities that provide media content, including advertisements provided by advertisers 102, to one or more customer premises 108. System 100 may include one or more content providers 104, although only one is shown in the figure for simplicity. System 100 may include different content providers 104 for different categories and/or channels of media content. As an example, system 100 may include a content provider 104 for Entertainment channel content, another for News channel content, another for Sports channel content, and yet another for Travel & Weather channel content. System 100 may include multiple content providers 104 for a single channel as well, such as multiple content providers 104 for Entertainment channel content.

As illustrated in FIG. 1, content provider 104 provides media content to a customer premises 108, including advertisements provided by advertisers 102. In one example, content provider 104 provides an interactive transport stream to customer premises 108. Such a transport stream may include a plurality of media channels, such as cable, television, and/or radio channels. Content provider 104 may also provide various interactive or on-demand programming, games, Internet access, web portal, or access to some other media content.

Content provider 104 generally provides numerous channels with many instances of media content, such as television shows, movies, commercials, and infomercials, and such media content may be provided via one or more networks 106 to customer premises 108.

Customer premises 108 may be a home, business, or any other location that receives media content from content provider 104. In one example, customer premises receives various communications services from content provider 104, including television, Internet, and telephone service. Optionally, customer premises 108 may receive media content from content provider 104 via a content processing device 112, which may then be connected to a media player 114, such as a television. Of course, content processing device 112 and media player 114 may be separate devices or a single device, or a user 110 may experience media content without using a content processing device.

Revenue management engine 120 may be one or more computing systems that communicates with one or more content providers 104 and is used to increase revenue from selling advertisement slots to advertisers 102. In one example, content provider 104 is connected to a revenue management engine 120, which may perform one or more of the process steps discussed in more detail below with respect to process 200. For example, content provider 104 may utilize revenue management engine 120 to group advertisers 102 into advertiser segments 103, where each advertiser within an advertiser segment shares some common characteristic, as discussed above. Thus, content provider 104 can develop pricing and groupings for advertiser segments 103, and then market those groupings to advertisers in those advertiser segments. Further, revenue management engine 120 may estimate utility values and determine optimal grouping of advertisement slots for each advertiser segment 103. In addition, revenue management engine 120 may also determine an estimated optimal price for each grouping of advertisement slots. Revenue management engine 120 may utilize historical data stored in one or more data stores to make certain determinations and/or calculations, such as data stored in data stores 122, 124.

Data store 122 may be a database that stores data relating to purchase requests received from advertisers 102 to purchase advertisement slots. For example, content provider 104 may receive purchase requests from advertisers 102 and store such purchase request data in data store 122. As illustrated in FIG. 1, data store 122 may store purchase request data identifying an advertisement slot or a listing of advertisement slots that an advertiser 102 would like to purchase (e.g., a requested group of advertisement slots). In addition, data store 122 may include data relating to a bid price per advertisement slot or for a grouping/listing of advertisement slots, a product or service to be marketed by the requesting advertiser 102, a requested media content channel to display the advertisement, a requested media program (e.g. television show, movie, or sporting event), the genre/theme of the requested media program, and the day/time request to provide the advertisement. In addition, data store 122 may store data relating to a target demographic that the advertiser 102 is attempting to reach.

Data store 124 may be a database that stores data relating to actual sales of advertisement slots to advertisers 102. For example, data store 124 may store the actual purchase price of one or more advertisement slots, a listing of the sold advertisement slots, the product/services being marketed by the advertiser 102, and the channel/program/day/time of the advertisement slot. Data stores 122, 124 may store any of a number of additional data, such as certain discounts provided to an advertiser 102, the timing of an advertisement purchase and/or request (e.g. 6 months in advance vs. 1 week in advance). As illustrated in FIG. 1, sales history data stored in data store 124 may include much of the same or similar data as stored in data store 122. However, in some instances, a content provider 104 may only track actual sales data, and not purchase request data, or vice versa. Therefore, as discussed in detail below with respect to process 200, a content provider 104 may utilize may utilize one or both types of data (e.g., purchase request data and/or sales history data) when making various determinations and/or calculations. As a result, under some exemplary approaches data stores 122,124 may be combined together into a single data store.

In general, computing systems and/or devices, such as content processing device 112, revenue management engine 120, and any computing devices utilized by advertisers 102 and content provider 104, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as data stores 122, 124 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, or some other computing device), stored on computer readable media associated therewith (e.g., disks, memories, etc.).

Figure 2:
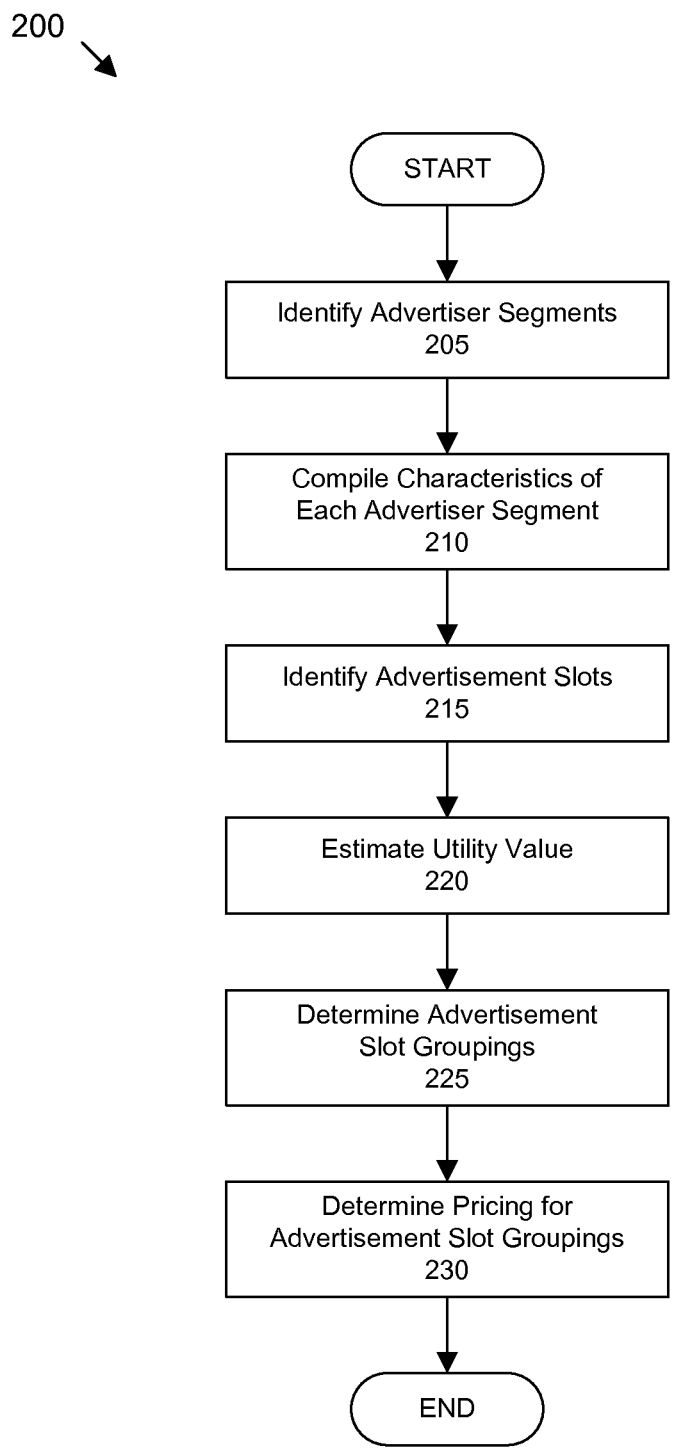
FIG. 2 illustrates an exemplary process for determining an estimated optimal pricing and/or an estimated optimal inventory for one or more advertisement slots

FIG. 2 illustrates an exemplary process flow 200 for determining an estimated optimal pricing and/or an estimated optimal inventory for one or more advertisement slots. Process 200 begins in step 205 by identifying a plurality of advertiser segments 103. In one example, revenue management engine 120 identifies a plurality of advertiser segments 103 by grouping advertisers 102 together that have one or more common characteristics. For example, advertisers 102 that are grouped into an advertiser segment 103 may share similar needs or similar advertisement slot purchasing habits/behavior, as previously discussed. In another example, revenue management engine 120 identifies a plurality of advertiser segments 103 based on some criteria that an advertiser is likely to use when selecting one or more advertisement slots, such as those advertisers 102 that have similar advertising strategies, target similar demographic groups, prefer similar time slots, or share some other common criteria for purchasing advertisement slots.

In step 205, revenue management engine 120 may analyze daa from data store 122 and/or data store 124 to identify (e.g., derive) the various advertiser segments 103. In addition, revenue management engine 120 may utilize such stored data to verify that a current set of advertiser segments 103 accurately reflect the common characteristics of the advertisers 102 belonging to the advertiser segment 103. In one example, revenue management engine 120 analyzes stored purchase request and/or sales history data, as stored in data stores 122, 124, to determine which advertisers 102 have requested similar advertisement slots, and then group those advertisers 102 into one or more advertiser segments 103. For example, one advertiser may target a wide demographic, and therefore fall into several advertiser segments 103.

Next, in step 210, characteristics of each advertiser segment 103 are compiled, such as those characteristics that are common to the advertisers 102 within the advertisement segment 103. As previously discussed, such characteristics may reflect the advertisement slot purchase preferences of advertisers 102. In one example, such characteristics relate to past advertisement slot sales for advertisers 102 in an advertiser segment 103. These characteristics may be the same characteristics used in step 205 to group advertisers 102 into advertiser segments 103. In one example, revenue management engine 120 analyzes certain characteristics of each advertiser 102 in each advertiser segment 103 in order to compile characteristics that are common to most or all advertisers 102 in one advertiser segment 103. For example, such characteristics may include a listing of preferred advertisement slots, a target demographic, a price target, desired advertisement slot groupings, or one or more advertisement slot characteristics (e.g., day/time of advertisement slots, program, channel, genre, or theme). Such characteristics may be compiled using data stores 122, 124.

In addition, such characteristics may include constraints that are common to advertisers 102 in an advertiser segment 103. For example, each advertiser 102 may provide content provider 104 with certain advertisement slot criteria, including constraints, when requesting and/or purchasing advertisement slots. Such constraints may include a time of day, a channel, a demographic (e.g., no beer commercials targeted toward children), a constraint on the number of ad impressions per a specified time period, or some other limiting criteria.

Next, in step 215, a plurality of advertisement slots are identified. In one example, revenue management engine 120 selects a random sample of advertisement slots for a given period. In another example, revenue management engine 120 selects all advertisement slots over a given time period (e.g., for a day, week, month, quarter, or year.) In one example, revenue management engine 120 selects a plurality of advertisement slots based on common groupings of advertisement slots, such as groupings that have been requested or sold in the past. Such past data can be analyzed using data stores 122, 124. In one example, the plurality of advertisement slots are pre-determined based on the number of allowable advertisement slots during a specific media content instance, such as a television program. For example, content provider 104 may be allowed a certain number of advertisement slots during each television program, and communicate that data to revenue management engine 120.

Next, in step 220, an estimated utility value is calculated for each identified advertisement slot based on each advertiser segment 103. The utility value may be estimated in terms of the amount of estimated value that an advertiser segment 103 may derive from a specific advertisement slot. For example, a utility value can be measured in terms of the price that an advertiser 102 would be theoretically willing to pay for an advertisement slot, possibly based on historical data. In one example, revenue management engine 120, utilizing data compiled in step 210, determines an estimated price target for each advertisement slot for each advertiser segment 103. For example, revenue management engine 120 can utilize data from data stores 122, 124 to estimate how much advertisers 102 grouped into a particular advertiser segment 103 would be willing to pay for each specific advertisement slot. Since advertisers 102 that are grouped into an advertiser segment 103 share common advertisement slot preferences, they also will likely be willing to pay a similar amount for similar advertisement slots.

Following step 220, system 100 will have grouped advertisers 102 into advertiser segments 103, identified common characteristics of each advertiser segment 103, identified a plurality of advertisement slots, and calculated an estimated utility value for each advertisement slot for each advertiser segment 103. Thus, system 100, possibly utilizing revenue management engine 120, will have a matrix of advertisement slots, where each advertisement slot has a plurality of associated utility values, where each utility value is associated with one of the advertiser segments 103. Thus, based on such estimated utility values, content provider 104 can efficiently differentiate which advertisement slots are not only likely to generate the highest revenue (e.g. fetch the highest price), but can quickly identify which advertiser segments 103, and therefore which specific advertisers, are likely to pay the highest price for those advertisement slots.

Next, in step 225, groupings of advertisement slots are determined. In one example, revenue management engine 120 attempts to determine estimated optimal groupings of advertisement slots in order to maximize revenue for all of the identified advertisement slots. In one example, the identified advertisement slots are divided into groups such that the sum of the estimated utility values of all groups is maximized. For example, revenue management engine 120 may utilize one or more optimization techniques. In one example, the groupings are determined using the following maximizing equation:

$$\sum_{i=1}^{i=n}\left(\sum_{j=1}^{j=n}T_{ij}*U_{ij}+\sum_{k=1}^{k=n}\Omega_k\right)$$

Where $T_{ij}$ is the availability of advertisement slot 'i' for advertiser segment 'j'. $T_{ij}$ may be expressed as a binary constraint, for example, 1 if the advertisement slot is available and 0 otherwise.

$U_{ij}$ may be the estimated utility of advertisement slot 'i' for advertiser segment 'j', and may be expressed as any value. In one example, $U_{ij}$ is expressed in terms of the estimated price that advertiser segment 'j' would pay for advertisement slot 'i'.

$\Omega_j$ may be the correlation impact of advertisement slot 'k' on advertiser segment 'j' already having advertisement slot 'i' (when $T_{ij}=1$).

While the utility value of an individual advertisement slot is one factor, it is not the only factor that may be considered when attempting to develop optimal groupings of advertisement slots. Any equation used to develop optimal groupings may also take certain other factors into account, such as the correlation between the utility values of individual advertisement slots. For example, an advertiser 102 may generally desire prime time advertisement slots, but would not purchase several advertisement slots next to one another. Therefore, the sum of individual utility values of advertisement slot will likely not be equal to the total utility value for the group of advertisement slots due to the impact of correlations among them. For example, suppose one grouping includes 10 advertisement slots. The value of that group could vary drastically. For example, the total utility value of the group would likely be much higher if those 10 advertisement slots were distributed over a single week than they would be distributed over a year.

For example an advertiser segment 103 may find that it is more effective to show five commercials (e.g., advertisement impressions) on the same day instead of distributing the commercials over five days, such as by only showing one per day. As such, the combined utility of five very similar advertisement slots, for the same advertiser, may be different than the sum of individual utilities due to the correlation impact.

In addition, each advertiser 102 may have certain rules or constraints that apply to their purchases of advertisement slots. Such constraints may be common to all or most advertisers 102 in a particular advertiser segment 103. Any maximizing equation used to developing groupings of advertisement slots may take such constraints into account. For example, beer advertisers would not advertise on children's channels, many advertisers 102 would prefer not to purchase consecutive advertisement slots (or advertisement slots that are close in time on the same channel or during the same media program). In one example, revenue management engine 120 applies a set of constraints to the above maximizing equation. Such constraints may be identified in step 210 as part of the characteristics common to each advertiser segment 103. Thus, the overall goal of any maximizing equation is to group advertisement slots together to achieve maximum total utility while respecting the purchase habits/constraints of advertisers 102.

Next, in step 230, an estimated optimal price is determined for each grouping of advertisement slots. In one example, an estimate optimal price is determined by correlating the total utility of the group of advertisement slots to a price. For example, where the utility values are estimated in terms of a price that an advertiser 102 is willing to pay, the estimate price may be the sum of all utility values for advertisement slots in the group. In addition, any valuation may factor in certain advertiser or advertiser segment constraints. In one example, revenue management engine 120 utilized data stored in data stores 122, 124 to determine an approximate optimal price for each group of advertisement slots.

The optimal price of the group of advertisement slots may be determined by attempting to optimize the expected revenue generated by the sale of a group. For example, revenue management engine 120 may perform an optimization of all possible groups in order to determining pricing that would maximize the value of all groups. In one example, the expected revenue may be calculated by multiplying the offer price by the probability of a sale, and determining a price at which the expected revenue would be maximized. For example, the higher the asking or offer price, the less likely content provider 104 will be able to sell the group for that price.

It should be noted that various steps in process 200 may be iterative and may be performed repeatedly while altering one or more of the variables with each iteration. For example, steps 215, 220, 225, and 230 may be repeated in order to compare the results while holding certain variables constant and changing other variables. In one example, revenue management engine 120 may repeat steps 215, 220, 225, and 230 while changing the identified advertisement slots; changing the estimated utility values for each advertisement slot for each advertiser segment 103 (such as based on changes in market conditions); or altering the advertisement slot groupings by using some new constraint. By repeating one or more steps iteratively, system 100 can use process 200 to determine an estimated optimal pricing and/or an estimated optimal inventory for one or more advertisement slots based on various advertiser segments 103. In addition, content provider 104 may utilize the estimated optimal pricing and/or an estimated optimal inventory to market advertisement slots to current and potential advertisers 102. For example, content provider 104 may develop packaged offerings of advertisement slots and, based on the advertiser segment 103, market the packaged offerings to those advertisers who are likely to derive the maximum utility from the grouping of advertisement slots. Therefore, content provider 104 may offer packages of advertisement slots to potential advertisers 102 based on their advertiser segment 103.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
   identifying a plurality of advertiser segments;
   identifying a plurality of advertisement slots;
   compiling characteristics of advertisers, wherein the characteristics are associated with at least one of the plurality of advertiser segments;
   estimating by a computing device, for each identified advertiser segment, a utility value for each identified advertisement slot;
   determining an estimated optimal grouping of advertisement slots for each advertiser segment based on the estimated utility values;
   grouping advertisers having common characteristics into at least one of the plurality of advertiser segments;
   associating one estimated utility value with advertisers grouped in at least one of the advertiser segments and another estimated utility value with advertisers grouped in another of the advertiser segments; and
   determining, for each advertiser segment, a price for the estimated optimal grouping of advertisement slots according to at least one of the estimated utility values.

2. The method of claim 1, further comprising determining an estimated optimal price for each grouping of advertisement slots based at least in part on historical data.

3. The method of claim 1, further comprising compiling advertisement slot preferences for each advertiser segment.

4. The method of claim 3, wherein the advertisement slot preferences include at least one of: a listing of preferred advertisement slots, a target demographic, and a price target.

5. The method of claim 3, further comprising utilizing the compiled advertisement slot preferences to determine an estimated optimal grouping of advertisement slots for each advertiser segment.

6. The method of claim 1, further comprising identifying the plurality of advertiser segments by:
   analyzing past sales data of advertisement slots; and
   determining which advertisers have requested similar advertisement slots.

7. The method of claim 1, further comprising:
   receiving a plurality of advertisement purchase requests; and
   determining which advertisers have requested similar advertisement slots.

8. The method of claim 7, wherein advertisers that have requested similar advertisement slots are grouped into at least one of the plurality of advertiser segments;

wherein each advertisement purchase request identifies a plurality of advertisement slots and includes a bid price; and wherein grouping advertisers that have requested similar advertisement slots includes:
associating each advertiser with an advertiser segment; and
storing the advertisement purchase requests and the advertiser segment association.

9. The method of claim 1, further comprising identifying the plurality of advertiser segments through at least one of a marketing study and a demographic study.

10. The method of claim 1, wherein an advertiser segment includes a plurality of advertisers that have similar advertisement slot preferences.

11. The method of claim 1, wherein an advertiser segment includes a plurality of advertisers that have similar advertisement slot constraints.

12. The method of claim 1, further comprising identifying the plurality of advertisement slots based on a time period.

13. The method of claim 1, further comprising identifying the plurality of advertisement slots based on previously purchased groupings of advertisement slots.

14. The method of claim 1, further comprising estimating, for each identified advertiser segment, the utility value for each identified advertisement slot in part by analyzing past sales of advertisement slots purchased by similar advertisers for similar advertisement slots.

15. The method of claim 1, further comprising determining an estimated optimal grouping of advertisement slots for each advertiser segment based on the estimated utility values according to the following equation:

$$\sum_{i=1}^{i=n}\left(\sum_{j=1}^{j=n}T_{ij}*U_{ij}+\sum_{k=1}^{k=n}\Omega_k\right)$$

where $T_{ij}$ is an availability of advertisement slot 'i' for advertiser segment 'j';
$U_{ij}$ is the estimated utility value of advertisement slot 'i' for advertiser segment 'j'; and
$\Omega_j$ is a correlation impact of advertisement slot 'k' on advertiser segment 'j'.

16. A system, comprising:
a content provider configured to provide media content to a plurality of customer premises via a network, the media content including a plurality of advertisement slots;
a data store configured to store data relating to past sales of advertisement slots; and
a computing device having a revenue management engine in communication with the content provider and the data store, the revenue management engine being configured to:
identify a plurality of advertiser segments based on data stored in the data store;
associate a plurality of advertisers with each advertiser segment;
identify a plurality of advertisement slots;
compile characteristics of advertisers, wherein the characteristics are associated with at least one of the plurality of advertiser segments;
estimate, for each identified advertiser segment, a utility value for each identified advertisement slot;
determine an estimated optimal grouping of advertisement slots for each advertiser segment based on the estimated utility values;
group advertisers having common characteristics into at least one of the plurality of advertiser segments;
associate one estimated utility value with advertisers grouped in at least one of the advertiser segments and another estimated utility value with advertisers grouped in another of the advertiser segments; and
determine, for each advertiser segment, an estimated optimal price for each grouping of advertisement slots according to the estimated utility values.

17. The system of claim 16, wherein the revenue management engine is further configured to compile advertisement slot preferences for each advertiser segment.

18. The system of claim 17, wherein the revenue management engine is further configured to utilize the compiled advertisement slot preferences to determine an estimated optimal grouping of advertisement slots for each advertiser segment.

19. The system of claim 16, wherein the revenue management engine is further configured to identify the plurality of advertiser segments by:
analyzing past sales data of advertisement slots; and
determining which advertisers have requested similar advertisement slots.

20. The system of claim 16, wherein the revenue management engine is further configured to:
determine a set of advertisement slot constraints associated with each advertiser segment; and
utilize the advertisement slot constraints when determining an estimated optimal grouping of advertisement slots for each advertiser segment.

21. The system of claim 16, wherein the revenue management engine is further configured to identify the plurality of advertisement slots based on previously purchased groupings of advertisement slots.

22. The system of claim 16, wherein the revenue management engine is further configured to estimate, for each identified advertiser segment, the utility value for each identified advertisement slot in part by analyzing past sales of advertisement slots purchased by similar advertisers for similar advertisement slots.

23. The system of claim 16, wherein the revenue management engine is further configured to determine an estimated optimal grouping of advertisement slots for each advertiser segment based on the estimated utility values according to the following equation:

$$\sum_{i=1}^{i=n}\left(\sum_{j=1}^{j=n}T_{ij}*U_{ij}+\sum_{k=1}^{k=n}\Omega_k\right)$$

where $T_{ij}$ is an availability of advertisement slot 'i' for advertiser segment 'j';
$U_{ij}$ is the estimated utility value of advertisement slot 'i' for advertiser segment 'j'; and
$\Omega_j$ is a correlation impact of advertisement slot 'k' on advertiser segment 'j'.

24. A non-transitory computer-readable medium tangibly embodying computer-executable instructions for when executed by a computer, causes the computer to perform operations comprising:

identifying a plurality of advertiser segments, wherein each advertiser segment includes a plurality of advertisers that have similar advertisement slot preferences;

identifying a plurality of advertisement slots;

estimating, for each identified advertiser segment, a utility value for each identified advertisement slot in part by analyzing past sales of advertisement slots purchased by similar advertisers for similar advertisement slots;

determining an estimated optimal grouping of advertisement slots for each advertiser segment based on the estimated utility values;

grouping advertisers into at least one of the plurality of advertiser segments;

associating one estimated utility value with advertisers grouped in at least one of the advertiser segments and another estimated utility value with advertisers grouped in another of the advertiser segments; and determining, for each advertiser segment, an estimated optimal price for each grouping of advertisement slots according to the estimated utility values.

25. The computer-readable medium of claim 24, further comprising instructions for:

compiling advertisement slot preferences for each advertiser segment; and utilizing the compiled advertisement slot preferences to determine an estimated optimal grouping of advertisement slots for each advertiser segment.

26. The computer-readable medium of claim 24, further comprising instructions for:

analyzing past sales data of advertisement slots;

determining which advertisers have requested similar advertisement slots; and grouping advertisers that have requested similar advertisement slots into an advertiser segment.

27. The computer-readable medium of claim 24, further comprising instructions for identifying the plurality of advertisement slots based on previously purchased groupings of advertisement slots.

* * * * *